(12) United States Patent
Shimizu et al.

(10) Patent No.: US 8,157,544 B2
(45) Date of Patent: Apr. 17, 2012

(54) MOTOR DRIVEN SUPERCHARGER WITH MOTOR/GENERATOR COOLING EFFICACY

(75) Inventors: Masahiro Shimizu, Tokyo (JP); Yasuyuki Shibui, Tokyo (JP)

(73) Assignee: IHI Corporation, Tokyo (JP)

( * ) Notice: Subject to any disclaimer, the term of this patent is extended or adjusted under 35 U.S.C. 154(b) by 474 days.

(21) Appl. No.: 12/377,987

(22) PCT Filed: Jul. 4, 2007

(86) PCT No.: PCT/JP2007/063353
§ 371 (c)(1),
(2), (4) Date: Feb. 18, 2009

(87) PCT Pub. No.: WO2008/020511
PCT Pub. Date: Feb. 21, 2008

(65) Prior Publication Data
US 2010/0247343 A1      Sep. 30, 2010

(30) Foreign Application Priority Data
Aug. 18, 2006    (JP) .................................. 2006-223057

(51) Int. Cl.
*F02B 39/00* (2006.01)
*F04D 29/58* (2006.01)
(52) U.S. Cl. .................. 417/410.1; 417/423.8; 417/407
(58) Field of Classification Search ................. 417/407, 417/423.8, 410.1
See application file for complete search history.

(56) References Cited

U.S. PATENT DOCUMENTS

| | | |
|---|---|---|
| 2,588,459 A | 3/1952 | Annen |
| 2,918,207 A | 12/1959 | Moore |
| 3,612,628 A | 10/1971 | Steele |
| 3,632,222 A | 1/1972 | Cronstedt |
| 3,675,056 A | 7/1972 | Lenz |
| 3,728,857 A | 4/1973 | Nichols |
| 3,742,123 A | 6/1973 | Haub, Jr. |
| 3,778,194 A | 12/1973 | Miller et al. |
| 3,811,741 A | 5/1974 | McInerney et al. |
| 3,890,780 A | 6/1975 | Hagemeister et al. |
| 3,927,530 A | 12/1975 | Braun |
| 3,961,867 A | 6/1976 | Woollenweber |
| 4,061,279 A | 12/1977 | Sautter |

(Continued)

FOREIGN PATENT DOCUMENTS

CA         2068369        11/1992

(Continued)

OTHER PUBLICATIONS

Office Action issued in co-pending U.S. Appl. No. 12/300,746, dated Dec. 22, 2010.

(Continued)

*Primary Examiner* — Karabi Guharay
(74) *Attorney, Agent, or Firm* — Griffin & Szipl, P.C.

(57) ABSTRACT

A motor stator (24) has a stator iron core (24a), a stator winding (24b), and a mold member (30) embedding them in an inner portion and having a high coefficient of thermal conductivity. The mold member (30) has a heat insulating layer (32) closely attached to an inner surface thereof surrounding a motor rotor (22) and to an outer surface thereof in an axial direction. Further, an outer sleeve (26) is provided so as to be closely attached to an outer peripheral surface of the mold member (30) and to an inner surface of a bearing housing (16). The outer sleeve (26) forms a liquid tight water cooling jacket (26b) between the outer sleeve and the bearing housing.

6 Claims, 5 Drawing Sheets

U.S. PATENT DOCUMENTS

| | | | |
|---|---|---|---|
| 4,198,063 A | 4/1980 | Shimizu et al. |
| 4,253,031 A | 2/1981 | Frister |
| 4,301,375 A | 11/1981 | Anderson |
| 4,641,977 A | 2/1987 | Woollenweber |
| 4,704,075 A | 11/1987 | Johnston et al. |
| 4,745,755 A | 5/1988 | Kawamura |
| 4,757,686 A | 7/1988 | Kawamura et al. |
| 4,833,887 A | 5/1989 | Kawamura et al. |
| 4,872,817 A | 10/1989 | DeKruif |
| 4,883,370 A | 11/1989 | Nakanishi |
| 5,121,605 A | 6/1992 | Oda et al. |
| 5,243,880 A | 9/1993 | Beier et al. |
| 5,323,613 A | 6/1994 | Akiyama |
| 5,587,332 A | 12/1996 | Chang et al. |
| 5,605,045 A | 2/1997 | Halimi et al. |
| 5,798,587 A | 8/1998 | Lee |
| 5,834,117 A | 11/1998 | Onishi |
| 5,857,332 A | 1/1999 | Johnston et al. |
| 5,870,894 A | 2/1999 | Woollenweber et al. |
| 5,904,471 A | 5/1999 | Woollenweber et al. |
| 5,906,098 A | 5/1999 | Woollenweber et al. |
| 6,032,466 A | 3/2000 | Woollenweber et al. |
| 6,102,672 A | 8/2000 | Woollenweber et al. |
| 6,129,524 A | 10/2000 | Woollenweber et al. |
| 6,145,314 A | 11/2000 | Woollenweber et al. |
| 6,160,332 A | 12/2000 | Tsuruhara |
| 6,218,747 B1 | 4/2001 | Tsuruhara |
| 6,253,747 B1 | 7/2001 | Sell et al. |
| 6,257,834 B1 | 7/2001 | Bremer et al. |
| 6,278,199 B1 | 8/2001 | Grant et al. |
| 6,293,769 B1 | 9/2001 | Radermacher et al. |
| 6,416,281 B1 | 7/2002 | Bremer et al. |
| 6,449,950 B1 | 9/2002 | Allen et al. |
| 6,609,375 B2 | 8/2003 | Allen et al. |
| 6,647,724 B1 | 11/2003 | Arnold et al. |
| 6,668,553 B1 | 12/2003 | Ghizawi |
| 6,753,628 B1 * | 6/2004 | Neal ................................ 310/43 |
| 6,768,332 B2 | 7/2004 | Lin et al. |
| 6,845,617 B1 | 1/2005 | Allen et al. |
| 6,871,499 B1 | 3/2005 | Allen et al. |
| 6,986,648 B2 | 1/2006 | Williams et al. |
| 7,008,194 B2 | 3/2006 | Frankenstein |
| 7,010,916 B2 | 3/2006 | Sumser et al. |
| 7,056,103 B2 | 6/2006 | LaRue |
| 7,352,077 B2 | 4/2008 | Shibui et al. |
| 7,360,361 B2 | 4/2008 | Prusinski et al. |
| 7,458,214 B2 | 12/2008 | Philippe |
| 7,670,056 B2 | 3/2010 | Petitjean et al. |
| 7,753,591 B2 | 7/2010 | Petitjean et al. |
| 7,765,846 B2 | 8/2010 | Stueckrad et al. |
| 2003/0017879 A1 | 1/2003 | Tsay et al. |
| 2003/0051475 A1 | 3/2003 | Allen et al. |
| 2003/0118461 A1 | 6/2003 | Hodapp et al. |
| 2004/0229703 A1 | 11/2004 | Jackson et al. |
| 2005/0082941 A1 | 4/2005 | Iida et al. |
| 2006/0081226 A1 | 4/2006 | Bolz |
| 2006/0123783 A1 | 6/2006 | Philippe |
| 2006/0225419 A1 | 10/2006 | Prusinski et al. |
| 2006/0245913 A1 | 11/2006 | Thiele et al. |
| 2007/0036664 A1 | 2/2007 | Shibui et al. |
| 2007/0108772 A1 | 5/2007 | Shibui et al. |
| 2008/0087018 A1 | 4/2008 | Woollenweber |
| 2009/0025386 A1 | 1/2009 | Rumsby |
| 2010/0132358 A1 | 6/2010 | Purdey et al. |
| 2010/0175377 A1 | 7/2010 | Hippen et al. |
| 2010/0266430 A1 | 10/2010 | Shimizu |
| 2011/0124421 A1 | 5/2011 | Kienhofer et al. |

FOREIGN PATENT DOCUMENTS

| | | |
|---|---|---|
| CH | 266731 | 2/1950 |
| CN | 2605696 Y | 3/2004 |
| DE | 4115273 | 6/1992 |
| DE | 10156704 | 5/2003 |
| DE | 10022113 | 11/2005 |
| DE | 10 2005 052 363 | 5/2007 |
| EP | 0079100 | 5/1983 |
| EP | 0212988 | 3/1987 |
| EP | 0304259 | 2/1989 |
| EP | 1348848 | 10/2003 |
| FR | 2859499 | 3/2005 |
| GB | 2021874 | 12/1979 |
| GB | 2162377 | 1/1986 |
| JP | 58-124024 | 7/1983 |
| JP | 60-153826 | 10/1985 |
| JP | 61-49126 | 4/1986 |
| JP | 61-237830 A | 10/1986 |
| JP | 01-019122 | 1/1989 |
| JP | 01-171006 | 7/1989 |
| JP | 02-099722 | 4/1990 |
| JP | 03-138430 | 6/1991 |
| JP | 4-119624 | 10/1992 |
| JP | H05026202 | 4/1993 |
| JP | 05199708 | 8/1993 |
| JP | 06-042361 | 2/1994 |
| JP | 06-288242 | 10/1994 |
| JP | 06-346748 | 12/1994 |
| JP | 07-102988 | 4/1995 |
| JP | 10-299500 | 11/1998 |
| JP | 11-182259 | 7/1999 |
| JP | 2000-110577 | 4/2000 |
| JP | 2000-130176 | 5/2000 |
| JP | 2000-145468 | 5/2000 |
| JP | 2000145468 A * | 5/2000 |
| JP | 2000-514987 | 11/2000 |
| JP | 2001-295655 | 10/2001 |
| JP | 2001-527613 | 12/2001 |
| JP | 3389748 | 3/2003 |
| JP | 2003-232340 | 8/2003 |
| JP | 2003232340 A | 8/2003 |
| JP | 2003-293785 | 10/2003 |
| JP | 2004-003420 | 1/2004 |
| JP | 2004-044451 | 2/2004 |
| JP | 2004-044452 | 2/2004 |
| JP | 2004-144094 | 5/2004 |
| JP | 10 2004 0089337 | 10/2004 |
| JP | 2005-023920 | 1/2005 |
| JP | 2005-069178 | 3/2005 |
| JP | 2005-120927 | 5/2005 |
| JP | 2005-207337 | 8/2005 |
| JP | 2005207337 A | 8/2005 |
| JP | 2005-248799 | 9/2005 |
| JP | 2005248799 A | 9/2005 |
| JP | 2006-002568 | 1/2006 |
| JP | 2006-514526 | 4/2006 |
| JP | 2007-297973 A | 11/2007 |
| JP | 2007-309101 | 11/2007 |
| JP | 2007-321698 A | 12/2007 |
| JP | 2007-321699 A | 12/2007 |
| JP | 2008-029166 | 2/2008 |
| JP | 2008-31949 A | 2/2008 |
| JP | 2009-243361 A | 10/2009 |
| JP | 2009-243365 A | 10/2009 |
| JP | 2010-121589 A | 6/2010 |
| KR | 10 2004 0105849 A | 12/2004 |
| WO | 84/04136 | 10/1984 |
| WO | 98-02652 | 1/1998 |
| WO | 98/30790 | 7/1998 |
| WO | 2005/024202 A1 | 3/2005 |
| WO | 2005/028876 A1 | 3/2005 |
| WO | 2005/113961 A1 | 12/2005 |

OTHER PUBLICATIONS

Notice of Allowance issued in co-pending U.S. Appl. No. 12/300,746, dated Apr. 19, 2011.

Office Action issued in co-pending U.S. Appl. No. 12/300,726, dated Dec. 21, 2010.

Office Action issued in Japanese Patent Application No. 2006-207973, of co-pending U.S. Appl. No. 12/864,837, dated Jan. 11, 2011 with an english translation.

http://answers.yahoo.com/question/index?qid=20100220052035A, dated Feb. 20, 2010, downloaded Mar. 9, 2011, 1 page.

http://www.answers.com/topic/friction-fit, downloaded Mar. 9, 2011, 1 page.

http://www.roymech.co.uk/Useful_Tables/ISO_Tolerances/ISO, downloaded Mar. 9, 2011, 2 pgs.

http://encyclopedia2.thefreedictionary.com/friction+fit, downloaded Mar. 9, 2011, 2 pgs.

Microfilm of the specification and drawings annexed to the request of Japanese Utility Model Application No. 10710/1983 (Laid-open No. 116537/1984), Toyota Motor Corp, Aug. 6, 1984.

Microfilm of the specification and drawings annexed to the request of Japanese Utility Model Application No. 142414/1985 ( Laid-open No. 49629/1987), Nissan Motor Corp, Mar. 27, 1987.

Microfilm of the specification and drawings annexed to the request of Japanese Utility Model Application No. 115203/1986 (Laid-open No. 22301/1988), Nissan Motor Corp, Feb. 15, 1988.

Microfilm of the specification and drawings annexed to the request of Japanese Utility Model Application No. 134167/1984 (Laid-open No. 49126/1986), dated Apr. 2, 1986.

First Office Action, issued in corresponding Chinese Patent Application No. 200780020456.2, issued Nov. 20, 2009.

Office Action issued in co-pending U.S. Appl. No. 11/617,211 mailed Feb. 22, 2010.

Office Action issued in Chinese Patent Application No. 200780030544.0. mailed Mar. 8, 2010.

Office Action issued in Korean Patent Application No. 10-2008-7028778, dated Feb. 28, 2011, of co-pending U.S. Appl. No. 12/300,726 and its english translation.

Office Action issued in co-pending U.S. Appl. No. 12/300,726, dated May 2, 2011.

International Search Report issued in corresponding application No. PCT/JP2007/063353, completed Jul. 26, 2007 and mailed Aug. 7, 2007.

Office Action mailed Aug. 23, 2011 in co-pending U.S. Appl. No. 12/280,816.

Office Action mailed Jul. 7, 2011 in co-pending U.S. Appl. No. 12/377,977.

Patent Abstracts of Japan English Abstract corresponding to the Hattori Document JP61-237830 (previously cited), a filed in a related U.S. Appl. No. 12/300,726 as "Exhibit A".

Espacenet English Abstract corresponding to the Hwang Document KR20040089337 (previously cited), filed in a U.S. Appl. No. 12/300,726 as "Exhibit B".

Machine English Translation of the Hwang Document KR20040089337 (previously cited), obtained from the Korean Patent Office, filed in a related U.S. Appl. No. 12/300,726 as "Exhibit C,".

Machine translation of JP2000-145468 (previously cited).

Office Action issued on Oct. 11, 2011 in corresponding Korean Patent Application No. 10-2009-7002939.

Office Action issued on Oct. 11, 2011 in corresponding Korean Patent Application No. 10-2009-7002938.

Office Action issued on Nov. 1, 2011 in corresponding Korean Patent Application No. 10-2008-7021399.

Office Action issued in related Korean Patent Application No. 10-2007-0005555 (included herein in Korean and Japanese) dated Mar. 30, 2009.

* cited by examiner

MOTOR DRIVEN SUPERCHARGER WITH MOTOR/GENERATOR COOLING EFFICACY

This is a National Phase Application in the United States of International Patent Application No. PCT/JP2007/063353 filed Jul. 4, 2007, which claims priority on Japanese Patent Application No. 223057/2006, filed Aug. 18, 2006. The entire disclosures of the above patent applications are hereby incorporated by reference.

BACKGROUND OF THE INVENTION

1. Field of the Invention

The present invention relates to a motor-driven supercharger having a built-in electric motor.

2. Description of the Related Art

To supply an air having a density increased by a compressor to an engine is called supercharging, and an apparatus for performing a driving work of the compressor on the basis of an exhaust energy of an engine in the case of executing the supercharging is called as an exhaust-gas turbocharger.

The exhaust-gas turbocharger is generally constituted by a compressor and a turbine which are arranged so as to sandwich a bearing unit therebetween. The compressor has a built-in compressor impeller, and the turbine has a built-in turbine impeller. The compressor impeller and the turbine impeller are coupled to each other by a connecting shaft (a shaft) supported by a bearing unit, and are structured such as to rotationally drive the turbine impeller on the basis of an exhaust gas of the engine, transmit the rotating force to the compressor impeller via the connecting shaft, and compress the air by the compressor impeller so as to supply the compressed air to the engine.

In the exhaust turbine supercharger mentioned above, there has been already proposed a structure having a built-in electric motor for assisting an acceleration at a time of rotating at a low speed (for example, patent documents 1 and 2). Hereinafter, the exhaust-gas turbocharger having the built-in electric motor is simply called as "motor-driven supercharger".

Further, patent document 3 is proposed as an air cooling system of the motor-driven supercharger.

As shown in FIG. 1, a turbocharger in the patent document 1 is provided with an electric motor (a stator 51 and a motor rotor 52) rotationally driving a rotor. The rotor is constituted by a turbine impeller 53, a compressor impeller 54, a shaft 55 coupling them and a spacer collar 56 to which the motor rotor 52 of the electric motor is attached. The shaft 55 is supported by a single semi-floating bearing 57. The semi-floating bearing 57 has a thrust surface 57a brought into contact with a hub 53a of the turbine 53, and a thrust surface 57b brought into contact with the spacer collar 56.

In accordance with this structure, a thrust force applied to the rotor is supported by a housing 50 via the thrust surfaces 57a and 57b of the semi-floating bearing 57 respectively engaging with the hub 53a of the turbine and the spacer collar 56.

As shown in FIG. 2, the motor assist supercharger in the patent document 2 has a motor rotor 62 supported by an extension portion 61a in an axial direction of a compressor wheel 61, and a stator 64 supported by a housing 63 so as to be spaced to an outer side in a radial direction from the motor rotor 62.

In the air cooling system of the patent document 3, as shown in FIG. 3, a turbocharger 72 coupled to an internal combustion engine 71 has an electric motor accommodated within a motor housing 73, the motor housing 73 has outlet and inlet ports 73a and 73b. The turbocharger 72 further has a compressor 74 and outlet and inlet ports 74a and 74b. Further, a first cooling hose 75 couples the compressor outlet 74a and the motor housing inlet 73b via an intercooler 76, and a second cooling hose 77 couples the motor housing outlet 73a and the compressor inlet 74b so as to recirculate an air heated by cooling the electric motor to the compressor 74.

Patent Document 1: U.S. Pat. No. 6,449,950 "ROTOR AND BEARING SYSTEM FOR ELECTRICALLY ASSISTED TURBOCHARGER"

Patent Document 2: U.S. Pat. No. 6,032,466 "MOTOR-ASSISTED TURBOCHARGERS FOR INTERNAL COMBUSTION ENGINES"

Patent Document 3: U.S. Pat. No. 6,609,375 "AIR COOLING SYSTEM FOR ELECTRIC ASSISTED TURBOCHARGER"

In the motor-driven supercharger, since a stator (a motor stator) and a rotor (a motor rotor) of a built-in electric motor generate heat by an eddy current or the like, it is necessary to efficiently cool them.

However, according to the patent document 1, in the case that the stator 51 is gripped by two electric motor casings 58a and 58b from both sides in an axial direction, the stator 51 is cooled only by a natural heat dissipation via the casings 58a and 58b. Accordingly, there is a problem that a cooling performance is low.

Further, in the example of the patent document 2, the casing 63 is provided with a water cooling jacket 66 coming into contact with an outer peripheral surface of the stator 64. However, since a heat input from the compressor wheel 61 and the motor rotor 62 which are heated is large, it is impossible to efficiently cool a whole of the stator.

Further, in the example of the patent document 3, since a compressed air cooled by the intercooler 76 is supplied into the motor housing 73, it is possible to efficiently cool an inner side of the motor housing. However, since a part of the compressed air is used in a circulating manner for cooling, an amount of the compressed air supplied to the engine is reduced, and an apparent efficiency of the compressor is lowered.

SUMMARY OF THE INVENTION

The present invention is made for solving the problem mentioned above. In other words, an object of the present invention is to provide a motor-driven supercharger which can efficiently cool a whole of a stator of an electric motor without using a part of a compressed air for cooling.

According to the present invention, there is provided a motor-driven supercharger comprising:

a turbine shaft having a turbine impeller in one end thereof;

a compressor impeller rotationally driven by the turbine shaft;

a bearing housing supporting the rotatable turbine shaft;

a motor stator fixed within the bearing housing; and a motor rotor rotationally driven by the motor stator, wherein the motor stator has a stator iron core, a stator winding, and a mold member embedding the stator iron core and the stator winding therein and having a high coefficient of thermal conductivity, and further comprising an outer sleeve closely attached to an outer peripheral surface of the mold member and to an inner surface of the bearing housing, wherein the outer sleeve forms a liquid tight water cooling jacket between the outer sleeve and the bearing housing.

Further, according to the present invention, there is provided a motor-driven supercharger comprising:

a turbine shaft having a turbine impeller in one end thereof;

a compressor impeller rotationally driven by the turbine shaft;

a bearing housing supporting the rotatable turbine shaft;

a motor stator fixed within the bearing housing; and a motor rotor rotationally driven by the motor stator, wherein the motor stator has a stator iron core, a stator winding, and a mold member embedding the stator iron core and the stator winding therein and having a high coefficient of thermal conductivity, and wherein the mold member has a heat insulating layer closely attached to an inner surface thereof (specifically, a surface facing in an inward radial direction) surrounding the motor rotor and to an outer surface thereof (specifically, a surface facing in an axial direction) in an axial direction.

Further, preferably, the mold member has: a hollow cylinder portion embedding the stator iron core therein and made of a thermally conductive resin; and an outward collar portion contacting both ends in an axial direction of the hollow cylinder portion, and embedding the stator winding therein and made of the thermally conductive resin.

Further, preferably, the outer sleeve has an inner surface (specifically, a surface facing in an inward radial direction) contacting outer surfaces of the hollow cylinder portion and the outward collar portion, and an inner surface (specifically, a surface facing in an axial direction) contacting an inner surface in the axial direction of the outward collar portion.

According to the present invention, it is not necessary that the mold member is made of the resin. According to the present invention, a cooling water space (in other words, a space through which a cooling water flows) provided in the outer sleeve forming the water cooling jacket may be formed in an inside of the outer sleeve so as to be prevented from being exposed to an outside of the outer sleeve. In this case, according to the present invention, there is provided a motor-driven supercharger comprising:

a turbine shaft having a turbine impeller in one end thereof;

a compressor impeller rotationally driven by the turbine shaft;

a bearing housing supporting the rotatable turbine shaft;

a motor stator fixed within the bearing housing; and a motor rotor rotationally driven by the motor stator, wherein the motor stator has a stator iron core, a stator winding, and a mold member embedding the stator iron core and the stator winding therein and having a high coefficient of thermal conductivity, further comprising an outer sleeve closely attached to an outer peripheral surface of the mold member and to an inner surface of the bearing housing, wherein the outer sleeve forms a liquid tight water cooling jacket, and wherein the mold member has:

a hollow cylinder portion embedding the stator iron core therein;

an outward collar portion contacting both ends in an axial direction of the hollow cylinder portion, and embedding the stator winding therein, and wherein the outer sleeve has an inner surface contacting outer surfaces of the hollow cylinder portion and the outward collar portion, and an inner surface contacting an inner surface in the axial direction of the outward collar portion.

In accordance with the structure of the present invention mentioned above, since the mold member of the motor stator embeds the stator iron core and the stator winding therein, and the outer sleeve is closely attached to the outer peripheral surface of the mold member and to the inner surface of the bearing housing, and the outer sleeve forms the liquid tight water cooling jacket between the outer sleeve and the bearing housing, it is possible to directly cool the outer peripheral surface of the mold member by the water cooling jacket without using a part of the compressed air for cooling, and it is possible to efficiently cool the stator iron core and the stator winding via the mold member having the high coefficient of thermal conductivity.

Further, since the mold member has the heat insulating layer which is closely attached to the inner surface thereof (specifically, the surface facing in the inward radial direction) surrounding the motor rotor and to the outer surface (specifically, the surface facing in the axial direction) thereof in the axial direction, it is possible to reduce the heat input from the compressor wheel and the motor rotor.

Further, the mold member has a hollow cylinder portion that embeds the stator iron core therein and that is made of a thermally conductive resin, and an outward collar portion that contacts both ends in an axial direction of the hollow cylinder portion and that embeds the stator winding therein and that is made of the thermally conductive resin. In addition, the outer sleeve has an inner surface (specifically, a surface facing in an inward radial direction) that contacts outer surfaces of the hollow cylinder portion and the outward collar portion, and an inner surface (specifically, a surface facing in an axial direction) that contacts an inner surface in the axial direction of the outward collar portion, it is possible to efficiently cool the whole of the stator of the electric motor from the outer surface and the inner surface of the mold member by the water cooling jacket.

In other words, a contact area between the mold member and the outer sleeve is increased by a contact area between the inner surface in the axial direction of the outward collar portion of the mold member and the inner surface (specifically, the surface facing in the axial direction) of the outer sleeve contacting the inner surface in the axial direction. The increase of the contact area greatly improves a heat transfer between the mold member constituting the motor stator and the outer sleeve constituting the water cooling jacket. This advantage can be obtained even if the mold member is not made of the resin.

Thus, it is possible to improve a cooling performance of the motor stator without dropping an efficiency of the compressor.

As mentioned above, in the case of increasing the contact area between the mold member and the outer sleeve, the outward collar portion has the portion positioned in the radially outer side of the hollow cylinder portion. Accordingly, it is possible to arrange the stator winding also in this portion (for example, refer to FIG. 5) so as to increase a winding number of the stator winding by that degree.

DESCRIPTION OF PREFERRED EMBODIMENT

Figure 1:
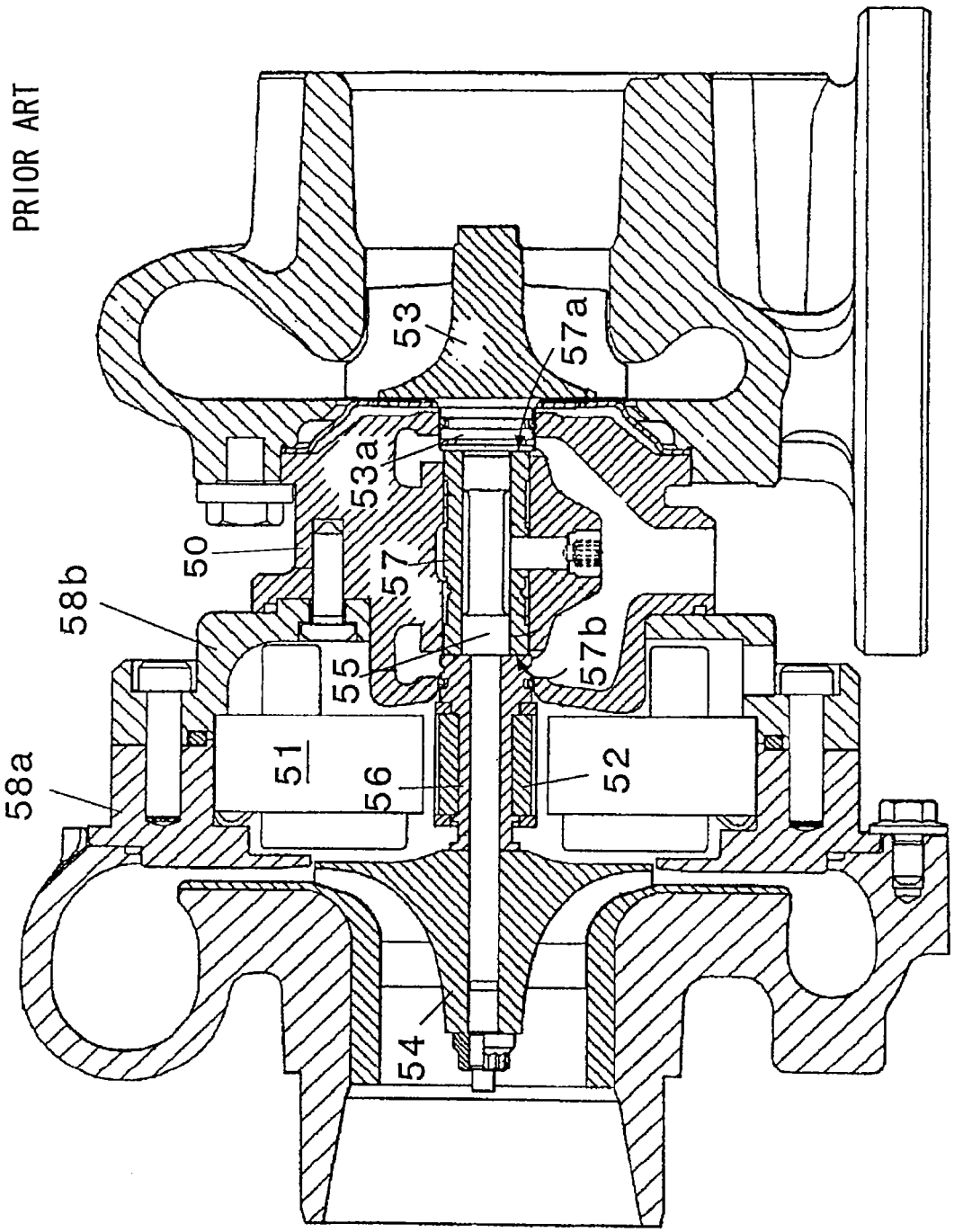
FIG. 1 is a schematic view of a turbocharger of patent document 1.
Figure 2:
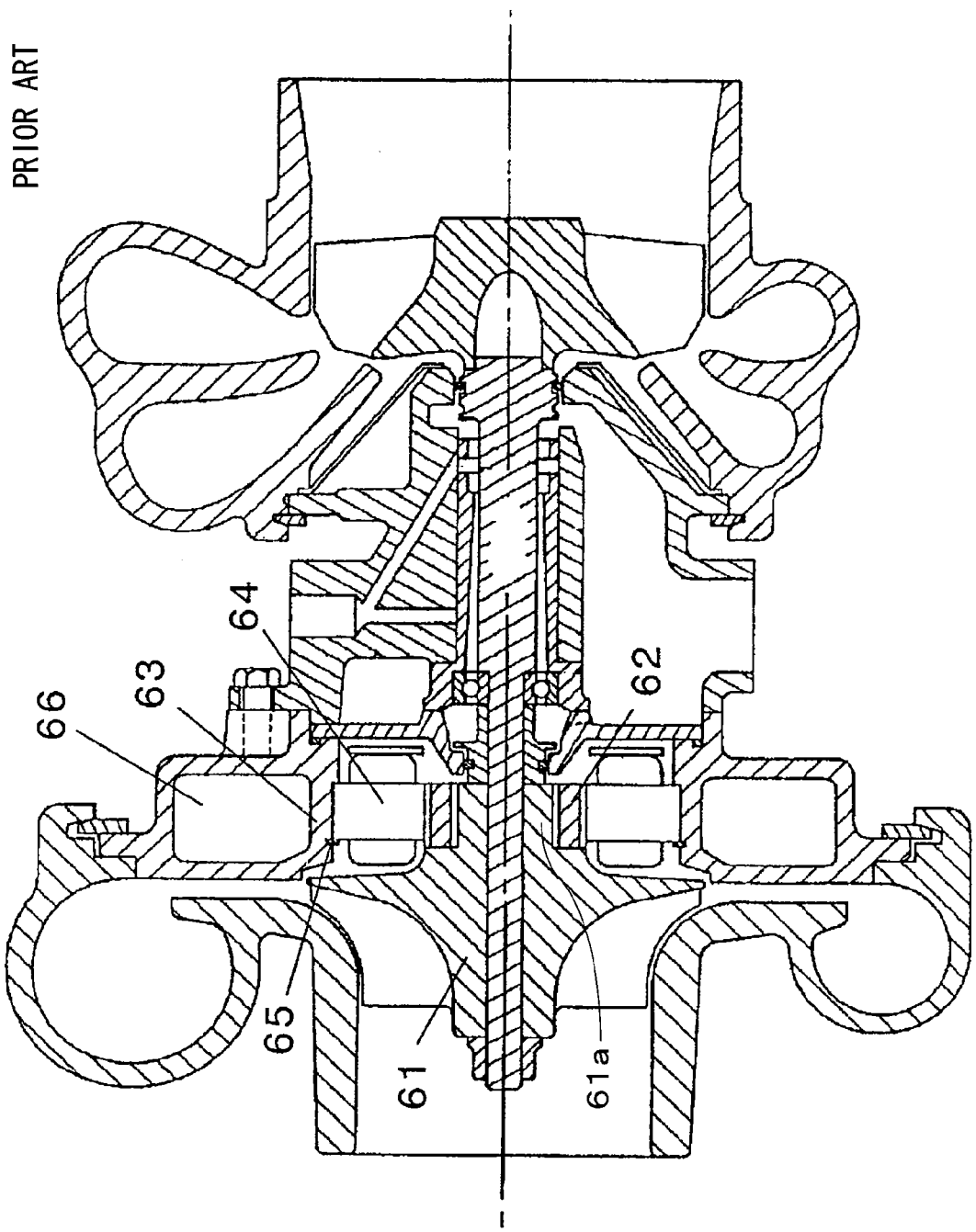
FIG. 2 is a schematic view of a motor assist supercharger of patent document 2.
Figure 3:
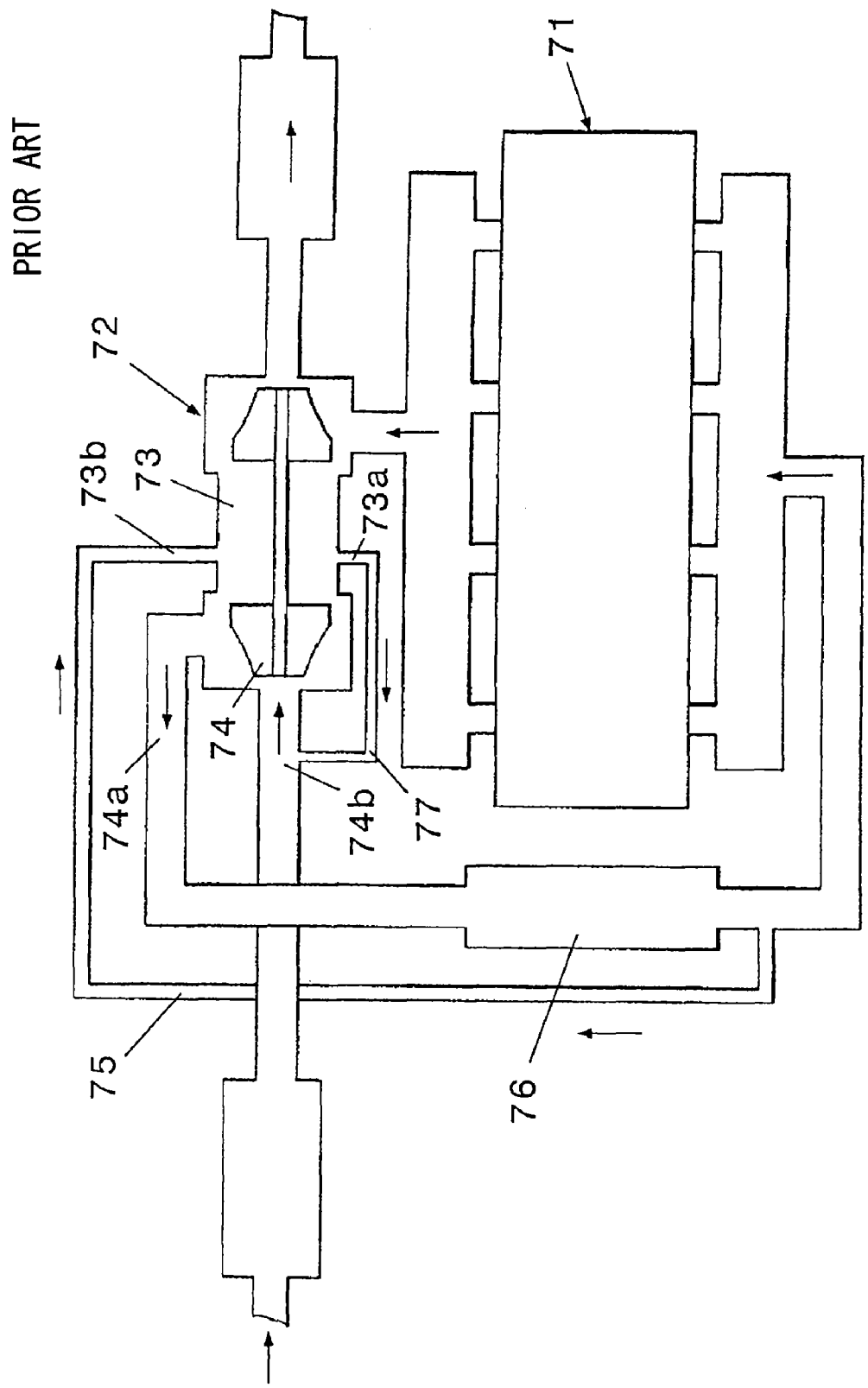
FIG. 3 is a schematic view of an air cooling system of patent document 3.

A description will be given below of a preferable embodiment in accordance with the present invention with reference to the accompanying drawings. In the drawings, the same reference numerals are attached to the common portions, and an overlapping description will be omitted.

Figure 4:
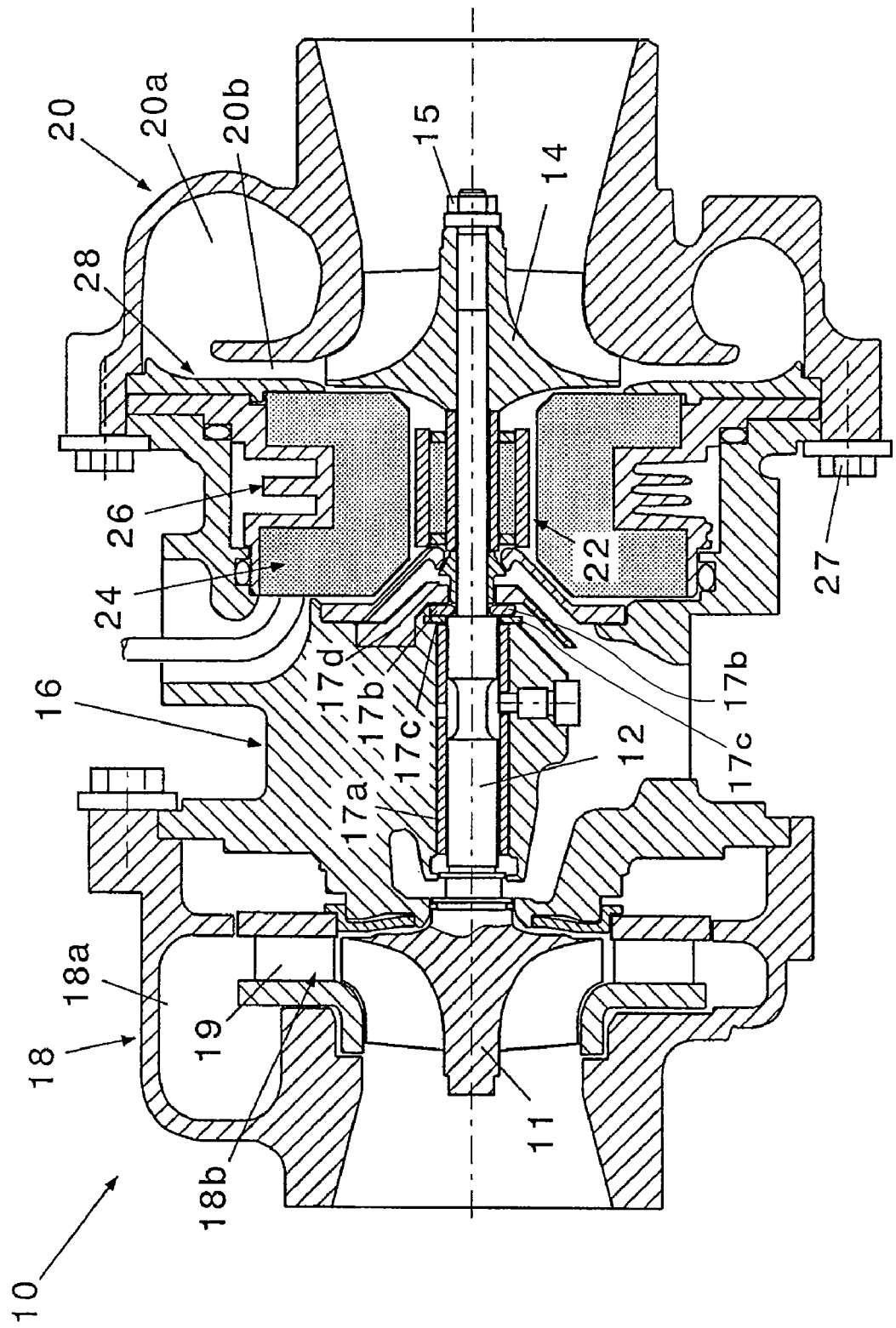
FIG. 4 is a schematic view of a whole of a motor-driven supercharger in accordance with the present invention.

FIG. 4 is a schematic view of a whole of a motor-driven supercharger in accordance with the present invention. In this drawing, a motor-driven supercharger 10 in accordance with the present invention is provided with a turbine shaft 12, a compressor impeller 14, and a housing. The housing is constituted by a bearing housing 16, a turbine housing 18 and a compressor housing 20 in this embodiment.

The turbine shaft 12 has a turbine impeller 11 in one end (a left end in the drawing) of itself. In this embodiment, the turbine impeller 11 is integrally formed with the turbine shaft 12. However, the present invention is not limited to this, but may be structured such that the turbine impeller 11 is independently attached to the turbine shaft 12.

The compressor impeller 14 is coupled to the other end (a right end in the drawing) of the turbine shaft 12 by an end nut 15 so as to be integrally rotated.

The bearing housing 16 supports the rotatable turbine shaft 12 by a bearing metal 17a. Further, the turbine shaft 12 is supported by a thrust collar 17b and thrust bearings 17c and 17d so as to be prevented from moving in an axial direction. Further, the bearing housing 16 has a lubricating oil flow path (not shown) for lubricating the bearing metal 17a, the thrust collar 17b and the thrust bearings 17c and 17d.

The turbine housing 18 surrounds the rotatable turbine impeller 11, and is coupled to the bearing housing 16. The turbine housing 18 has a scroll chamber 18a into which an exhaust gas is introduced from an outer portion of the turbine housing 18. The turbine housing 18 also has an annularly formed flow path 18b guiding an exhaust gas from the scroll chamber 18a to the turbine impeller 11.

Further, a plurality of nozzle vanes 19 are arranged in the flow path 18b at a fixed interval in a peripheral (i.e., circumferential) direction. The nozzle vane 19 is a variable nozzle vane, and it is preferable that the nozzle vanes 19 can change a flow path area formed therebetween. However, the present invention is not limited to this, and the nozzle vane may be a fixed nozzle vane or may be structured such as to be provided with no nozzle.

The compressor housing 20 surrounds the rotatable compressor impeller 14 and is coupled to the bearing housing 16. The compressor housing 20 has a scroll chamber 20a into which a compressed air is introduced. The compressor housing 20 also has an annularly formed flow path 20b guiding a compressed air from the compressor impeller 14 to the scroll chamber 20a.

In accordance with the structure mentioned above, it is possible to rotationally drive the turbine impeller 11 by the exhaust gas of the engine, it is possible to transmit the rotating force to the compressor impeller 14 via the turbine shaft 12, and it is possible to compress the air by the compressor impeller 14 so as to supply the compressed air to the engine.

In FIG. 4, the motor-driven supercharger 10 in accordance with the present invention is further provided with a motor rotor 22 and a motor stator 24.

The motor rotor 22 is a rotor of the electric motor, and the motor stator 24 is a stator of the electric motor. The motor rotor 22 and the motor stator 24 constitute a brushless alternating-current motor.

It is preferable that the alternating-current motor satisfies requirement of a high speed revolution (for example, at least 100 thousand to 200 thousand rpm) of the turbine shaft 12, and enables a rotational driving at the time of accelerating and enables energy regeneration at the time of decelerating. Further, it is preferable that a driving voltage of the alternating-current motor is equal to or higher than a direct-current voltage (for example, 12 V) of a battery mounted on a vehicle.

Figure 5:
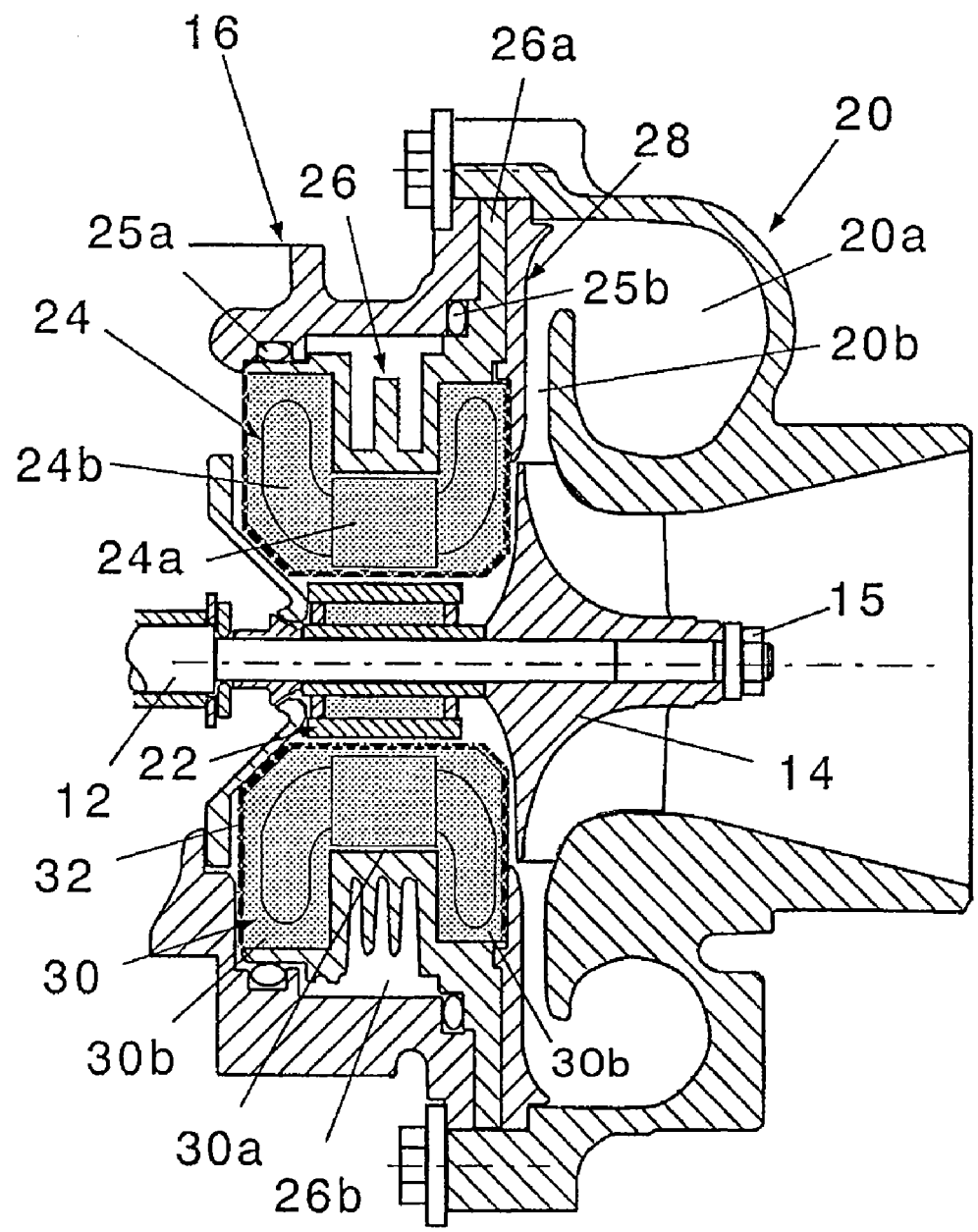
FIG. 5 is a partly enlarged view of FIG. 4.

FIG. 5 is a partly enlarged view of FIG. 4. As shown in FIGS. 4 and 5, the motor rotor 22 is fixed to a side surface of the turbine shaft 12 or the compressor impeller 14 by mating.

In FIG. 5, the motor stator 24 is constituted by a stator iron core 24a, a stator winding 24b, and a mold member 30. The mold member 30 embeds the stator iron core 24a and the stator winding 24b in itself, and has a high coefficient of thermal conductivity. Further, the mold member 30 has a heat insulating layer 32 closely attached to an inner surface of the mold member 30 (specifically, a surface facing in an inward radial direction) surrounding the motor rotor 22, and an outer surface of the mold member 30 (specifically, a surface facing in an axial direction) in an axial direction. In other words, the heat insulating layer 32 is provided so as to be closely attached to the inner surface and the axial direction outer surface of the mold member 30.

It is preferable that the mold member 30 is made of a material having a high coefficient of thermal conductivity, for example, a graphite, a silicon, a plastic and the like. Further, it is preferable that the heat insulating layer 32 is formed in a thin layer shape so as not to weaken a magnetic field of the motor stator 24, and is made of a material having a low coefficient of thermal conductivity, for example, a plastic foam, a silica wool and the like. The material having the high coefficient of thermal conductivity means a material of which coefficient of thermal conductivity is equal to or more than 1 W/(m·K).

Further, the mold member 30 of the heat insulating layer 32 may be attached by adhesion or integral molding.

Further, in this embodiment, the mold member 30 is constituted by a hollow cylinder portion 30a embedding the stator iron core 24a in an inner portion of itself and made of a thermally conductive resin, and an outward collar portion 30b coming into contact with both ends in an axial direction of the hollow cylinder portion 30a and embedding the stator winding 24b in an inner portion of itself and made of a thermally conductive resin.

Further, the motor-driven supercharger 10 in accordance with the present invention is provided with an outer sleeve 26 and a seal plate 28.

The outer sleeve 26 is closely attached to an outer peripheral surface of the mold member 30 and to an inner surface of the bearing housing 16, and forms a liquid tight water cooling jacket 26b between the outer sleeve 26 and the bearing housing 16.

Further, the motor-driven supercharger 10 in accordance with the present invention has seal members 25a and 25b sealing in a liquid tight manner between the bearing housing 16 and the outer sleeve 26 and spaced in an axial direction. The seal member 25a is an O-ring sealing an inner peripheral surface of the bearing housing 16 in this embodiment, and the seal member 25b is an O-ring sealing an inner surface in an axial direction of the flange portion 26a in this embodiment. Both of the seal members 25a and 25b may be O-rings sealing surfaces facing in a radial direction (for example, the inner peripheral surface of the bearing housing 16), or be O-rings sealing surfaces facing in the axial direction (for example, the inner surface in the axial direction of the flange portion 26a), or be the other seals.

In accordance with this structure, a liquid tight water cooling jacket 26b is formed between the bearing housing 16 and the outer sleeve 26. A cooling water is supplied to the water cooling jacket 26b from a cooling water supply port (not shown), and the cooling water is discharged from a cooling water discharge port (not shown).

The seal plate 28 is fastened in an axial direction together with the flange portion 26a of the outer sleeve 26 between the bearing housing 16 and the compressor housing 20.

The seal plate 28 comparts between the compressor housing 20 and the motor stator 24, and is closely attached to the compressor side of the outer sleeve 26.

In accordance with the structure of the present invention mentioned above, since the mold member 30 of the motor stator 24 embeds the stator iron core 24a and the stator winding 24b in the inner portion of itself, and the outer sleeve 26 is closely attached to the outer peripheral surface of the mold member 24 and the inner surface of the bearing housing 16, and the outer sleeve 26 forms the liquid tight water cooling jacket 26b between the outer sleeve 26 and the bearing housing, it is possible to directly cool the outer peripheral surface of the mold member 30 by the water cooling jacket 26b without using a part of the compressed air for cooling, and it is possible to efficiently cool the stator iron core 24a and the stator winding 24b via the mold member 30 having the high coefficient of thermal conductivity.

Further, since the mold member 30 has the heat insulating layer 32 closely attached to the inner surface of itself (specifically, the surface facing in the inward radial direction) surrounding the motor rotor 22 and to the outer surface of itself (specifically, the surface facing in the axial direction) in the axial direction, it is possible to reduce the heat input from the compressor wheel 14 and the motor rotor 22.

Further, since the mold member 30 has the hollow cylinder portion 30a embedding the stator iron core 24a in the inner portion of itself and made of the thermally conductive resin, and the outward collar portion 30b coming into contact with both ends in the axial direction of the hollow cylinder portion 30a, embedding the stator winding 24b in the inner portion and made of the thermally conductive resin, and the outer sleeve 26 has an inner surface (specifically, the surface facing in the inward radial direction) contacting the radially-outward-facing outer surfaces of the hollow cylinder portion 30a and the outward collar portion 30b, and an inner surface (specifically, the surface facing in the axial direction) contacting the inner surface in the axial direction of the outward collar portion 30b, it is possible to efficiently cool the whole of the stator of the electric motor from the outer surface and the inner surface of the mold member 30 by the water cooling jacket 26b.

In other words, a contact area between the mold member 30 and the outer sleeve 26 is increased by a contact area between the inner surface in the axial direction of the outward collar portion 30b of the mold member 30 and the inner surface (specifically, the surface facing in the axial direction) of the outer sleeve 26 contacting the inner surface in the axial direction of the outward collar portion 30b. The increase of the contact area greatly improves heat transfer between the mold member 30 constituting the motor stator 24 and the outer sleeve 26 constituting the water cooling jacket 26b. In this case, this advantage can be obtained even if the mold member 30 is not made of the resin. In other words, in accordance with the present invention, the mold member 30 is not necessarily made of the resin. Further, in this case, a cooling water space (in other words, a space through which a cooling water flows) provided in the outer sleeve 26 forming the water cooling jacket may be formed inside the outer sleeve 26 so as to be prevented from being exposed to the outside of the outer sleeve 26.

Accordingly, it is possible to improve a cooling performance of the motor stator 24 without dropping an efficiency of the compressor.

As mentioned above, in the case of increasing the contact area between the mold member 30 and the outer sleeve 26, the outward collar portion 30b has the portion positioned in the radially outer side of the hollow cylinder portion 30a. Accordingly, it is possible to arrange the stator winding 24b also in this portion (for example, refer to FIG. 5 so as to increase the winding number of the stator winding 24b at that degree.

In this case, it goes without saying that the present invention is not limited to the embodiment mentioned above, and can be variously modified within a range which does not deviate from the scope of the present invention.

What is claimed is:

1. A motor-driven supercharger comprising:
a turbine shaft having a turbine impeller in one end thereof;
a compressor impeller rotationally driven by the turbine shaft;
a bearing housing supporting the rotatable turbine shaft;
a motor stator fixed within the bearing housing; and
a motor rotor rotationally driven by the motor stator,
wherein the motor stator has a stator iron core, a stator winding, and a mold member embedding the stator iron core and the stator winding therein and having a high coefficient of thermal conductivity, and
further comprising an outer sleeve closely attached to an outer peripheral surface of the mold member and to an inner surface of the bearing housing, wherein the outer sleeve forms a liquid tight water cooling jacket,
wherein the mold member has a hollow cylinder portion embedding the stator iron core therein, and a pair of radially outward extending collar portions respectively contacting both ends in an axial direction of the hollow cylinder portion, and embedding the stator winding therein,
the outer sleeve includes a part that is sandwiched in the axial direction between the pair of radially outward extending collar portions, and that has a pair of outboard surfaces respectively contacting inner surfaces in the axial direction of the pair of the radially outward extending collar portions,
each of the radially outward extending collar portions has a part positioned at the outer side of the hollow cylinder portion in a radial direction of the turbine shaft,
the part of each of the radially outward extending collar portions has the inner surface extending in the axial direction of the radially outward extending collar portion.

2. The motor-driven supercharger claimed in claim 1, wherein the mold member has a heat insulating layer closely attached to an inner surface thereof, the inner surface of the mold member surrounding the motor rotor and has an outer surface thereof extending in the axial direction.

3. The motor-driven supercharger as claimed in claim 1, wherein the hollow cylinder portion and each of the radially outward extending collar portions are made of the thermally conductive resin, and
the outer sleeve has an inner surface contacting an outer surface of the outward collar portion.

4. The motor-driven supercharger as claimed in claim 3, wherein the outer sleeve has an inner surface contacting an outer surface of the hollow cylinder portion and the radially outward extending collar portions, and an inner surface contacting an inner surface in the axial direction of the radially outward extending collar portions.

5. A motor-driven supercharger comprising:

a turbine shaft having a turbine impeller in one end thereof;

a compressor impeller rotationally driven by the turbine shaft;

a bearing housing supporting the rotatable turbine shaft;

a motor stator fixed within the bearing housing; and a motor rotor rotationally driven by the motor stator, wherein the motor stator has a stator iron core, a stator winding, and a mold member embedding the stator iron core and the stator winding therein and having a high coefficient of thermal conductivity, further comprising an outer sleeve closely attached to an outer peripheral surface of the mold member and to an inner surface of the bearing housing, wherein the outer sleeve forms a liquid tight water cooling jacket, and wherein the mold member has:
a hollow cylinder portion embedding the stator iron core therein;
an outward collar portion contacting both ends in an axial direction of the hollow cylinder portion, and embedding the stator winding therein, and
wherein the outer sleeve has an inner surface contacting outer surfaces of the hollow cylinder portion and the outward collar portion, and an inner surface contacting an inner surface in the axial direction of the outward collar portion.

6. A motor-driven supercharger as claimed in claim 5, wherein the mold member has a heat insulating layer closely attached to an inner surface thereof surrounding the motor rotor and to an outer surface thereof in the axial direction.

* * * * *